United States Patent [19]

Desbrandes

[11] Patent Number: 5,103,178

[45] Date of Patent: Apr. 7, 1992

[54] METHOD USING A PLURALIYT OF ELECTRODE, INCLUDING A REFERENCE ELECTRODE, FOR RECORDING A SPONTANEOUS POTENTIAL CURVE IN A BOREHOLE WHILE DRILLING

[75] Inventor: Robert Desbrandes, Baton Rouge, La.

[73] Assignee: Louisiana State University and Agricultural and Mechanical College, Baton Rouge, La.

[21] Appl. No.: 580,082

[22] Filed: Sep. 11, 1990

[51] Int. Cl.⁵ .......................... G01V 3/26; G01V 3/34
[52] U.S. Cl. .............................. 324/351; 346/33 WL; 364/422
[58] Field of Search ............... 324/351, 352, 353, 366; 364/422; 346/33 WL

[56] References Cited

U.S. PATENT DOCUMENTS

| | | | |
|---|---|---|---|
| 2,210,795 | 8/1940 | Cloud | 324/351 |
| 2,230,999 | 2/1941 | Doll | 324/351 |
| 2,249,769 | 7/1941 | Leonardon | 324/351 |
| 2,415,364 | 2/1947 | Mounce | 324/366 |
| 2,694,179 | 11/1954 | Walstrom | 324/351 |
| 3,268,801 | 8/1966 | Clements et al. | 324/351 |
| 3,715,653 | 2/1973 | Sauter | 324/351 |
| 4,451,790 | 5/1984 | Bravenec | 324/351 |
| 4,523,148 | 6/1985 | Maciejewski | 324/351 |

Primary Examiner—Gerard R. Strecker
Attorney, Agent, or Firm—William David Kiesel; Robert C. Tucker

[57] ABSTRACT

An apparatus and method for obtaining a spontaneous potential curve, which apparatus is comprised of: (a) an elongated body: (b) a series of vertically spaced electrodes for measuring electrical potential, wherein one of the electrodes is a reference electrode; and (c) a means for recording or transmitting the various electrical potentials to the surface. Preferably the apparatus is part of drillstring for taking measurements while drilling.

10 Claims, 4 Drawing Sheets

METHOD USING A PLURALIYT OF ELECTRODE, INCLUDING A REFERENCE ELECTRODE, FOR RECORDING A SPONTANEOUS POTENTIAL CURVE IN A BOREHOLE WHILE DRILLING

FIELD OF THE INVENTION

The present invention relates to a method and apparatus for recording a spontaneous potential curve in a borehole traversed by an earth formation. The present invention also relates to a method and apparatus for obtaining such a curve while drilling.

BACKGROUND OF THE INVENTION

Spontaneous potential curves, sometimes referred to as self potential curves, record the electrical potential (voltage) produced by the interaction of formation connate water, conductive drilling fluid, and certain ion-selective rocks. It is a basic component of almost all formation evaluation work. Such curves are useful for: differentiating potentially porous and permeable reservoir formations, such as sandstone, limestone, and dolomite, from nonpermeable formations such as clays and shales; defining bed boundaries and permitting correlation of beds; giving a qualitative indication of bed shaliness; aiding in mineral identification; and permitting the determination of formation water resistivity.

The curve generated by conventional methods is usually a recording versus depth of the difference between the electrical potential of a movable electrode in the borehole and the electrical potential of a fixed surface electrode. A description of such technology can be found in "Fundamentals of Well-Log Interpretation, Part I, The Acquisition of Logging Data" by O. Serra, Elsevier, New York, 1984, at pages 77 to 88. A typical conventional method is one illustrated in (a) of FIG. 1 hereof wherein a wireline apparatus is shown which includes: two electrodes, one at the surface (N) and the other in the wireline apparatus in the borehole (M); a high impedance millivoltmeter (MV), which is comprised of a galvanometer G and resistor R, and an adjustable counter-potential (A) to offset the various polarization or extraneous DC potentials which may occur. Such conventional methods have several disadvantages. For example, the measurement is made between two electrodes which can be from about 500 to about 30,000 feet apart, thus being susceptible to spurious potentials which are frequently induced and which can alter the accuracy of the curve. Furthermore, the electrodes are usually made of lead or steel, the surface of which are susceptible to oxidation. A slow varying polarization may occur creating drifts in the recording. Also, magnetization of the spool of cable can also induce a slow sinusoidal varying potential. If the apparatus is computerized, the simplicity of conventional methods may be a drawback since quantifiable parameters must be used to correct for all of the spurious effects mentioned above. By the practice of the present invention, a spontaneous potential curve can be generated by a wireline test tool without encountering many of these problems.

Logging while drilling is becoming more and more common owing to improved technology and the advantages of getting formation evaluation data in real-time. Conventional techniques make it impossible to obtain a spontaneous potential curve while drilling, primarily because no insulated electrical connector exists between the surface and downhole. Thus, there remains a substantial need in the art for new methods and apparatus which are capable of recording self potential curves while drilling.

SUMMARY OF THE INVENTION

In accordance with the present invention there is provided an apparatus for obtaining a spontaneous potential curve in a well borehole. The apparatus is comprised of: (a) an elongated body; (b) a series of electrodes vertically spaced for measuring electrical potential, wherein one of the electrodes is a reference electrode; and (c) means for recording or transmitting the various electrical potentials.

In preferred embodiments of the present invention the apparatus is on a drillstring.

The present invention also provides a method for obtaining a spontaneous potential curve while drilling a well borehole traversed by an earth formation. The method comprises: (a) drilling a well borehole with a drillstring which includes a module containing, (i) a series of vertically spaced electrodes for measuring electrical potential, in volts, wherein one of the electrodes is a reference electrode; (ii) a means for recording, or transmitting, the various potentials, and (b) taking a measurement of the potential of the electrodes at incremental depths during drilling; and (c) recording and generating a potential curve from said measurements.

In another embodiment of the present invention there is provided a method for recording a spontaneous potential curve in a well borehole by use of a wireline apparatus, which method comprises: (a) positioning a wireline downhole apparatus containing a series of vertically spaced electrodes in the well borehole at a predetermined depth; (b) raising, or lowering, the test tool in incremental steps; (c) measuring and recording the electrical potential of each electrode at each incremental step; wherein the test tool is comprised of: (i) an elongated body; (ii) a series of vertically spaced electrodes for measuring the electrical potential, in volts, wherein one of the electrodes is the reference electrode; and (iii) a means for recording or transmitting the various potentials to the surface.

In preferred embodiments of the present invention the apparatus also includes a voltmeter and the electrodes are equidistant apart.

In a preferred embodiment of the present invention, the electrodes are from about 0.5 to 3 feet apart.

In another preferred embodiment of the present invention, there are six electrodes each spaced about 0.5 to 2 feet apart, and the bottom most electrode is the reference electrode.

The present invention also provides for a downhole test tool as described above.

DETAILED DESCRIPTION OF THE INVENTION

Figure 1:
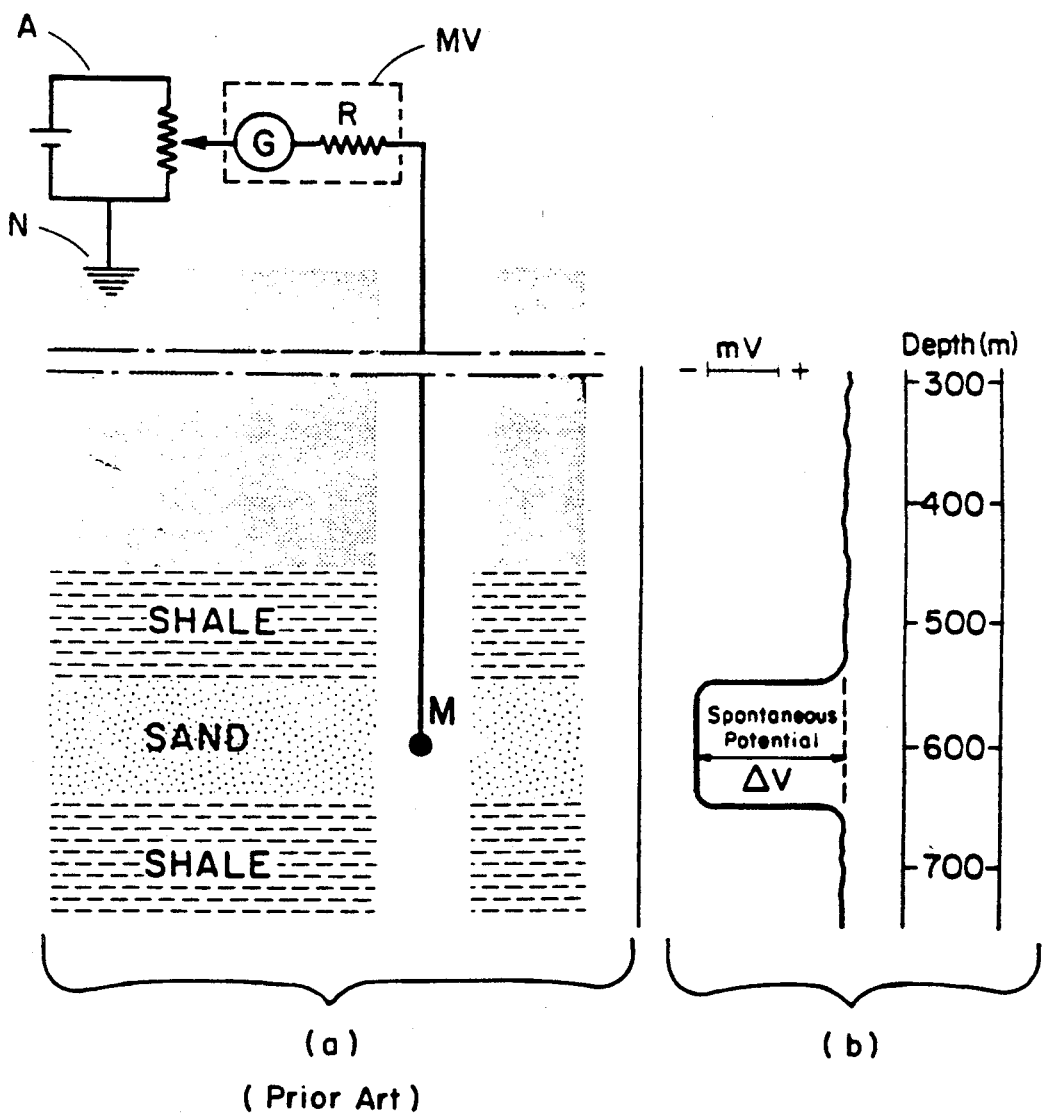
FIG. 1, at (a), is a graphical representation of a conventional prior art technique for making measurements to generate a spontaneous potential curve and FIG. 1, at (b), is a representation of how a spontaneous potential curve could correspond to a borehole traversed by an earth formation.

A typical spontaneous potential curve from a well formation is illustrated at (b) in FIG. 1 hereof. Permeable beds typically deflect the spontaneous potential curve to the left, whereas, impermeable beds deflect the curve to the right. Hence, the maximum deflection to the left usually is an indication of sands, whereas a left or negative deflection occurs opposite porous and permeable sands and limestone. There is typically a relatively uniform potential to the right or in the shale zones. This potential is commonly referred to as the shale line and is the base from which spontaneous potential deflections are measured. Similarly, there is normally a constant negative potential opposite clean sand or limes. A shaly sand will create a deflection which is somewhere in between the shale baseline and the clean sand line.

The method and apparatus of the present invention substantially eliminates spurious electrical potentials typically encountered when producing a spontaneous potential curve by conventional techniques. Furthermore, the practice of the present invention eliminates the need for a surface reference electrode. The reference electrode in the present invention is incorporated in the downhole test tool along with the potential electrodes. Also, the present invention preferably makes use of digital recording and processing means.

An important embodiment of the present invention is a method and apparatus for obtaining measurements while drilling. Measurement while drilling (MWD), sometimes referred to as logging while drilling (LWD) when logging parameters are measured, is a technology which is widely used today. MWD/LWD can transmit to the surface, in real-time, both drilling parameters (such as directional data, weight-on-bit, torque, and pressure, temperature, etc.) and logging parameters (such as resistivity, gamma ray, formation density, neutron, etc.).

Figure 2:
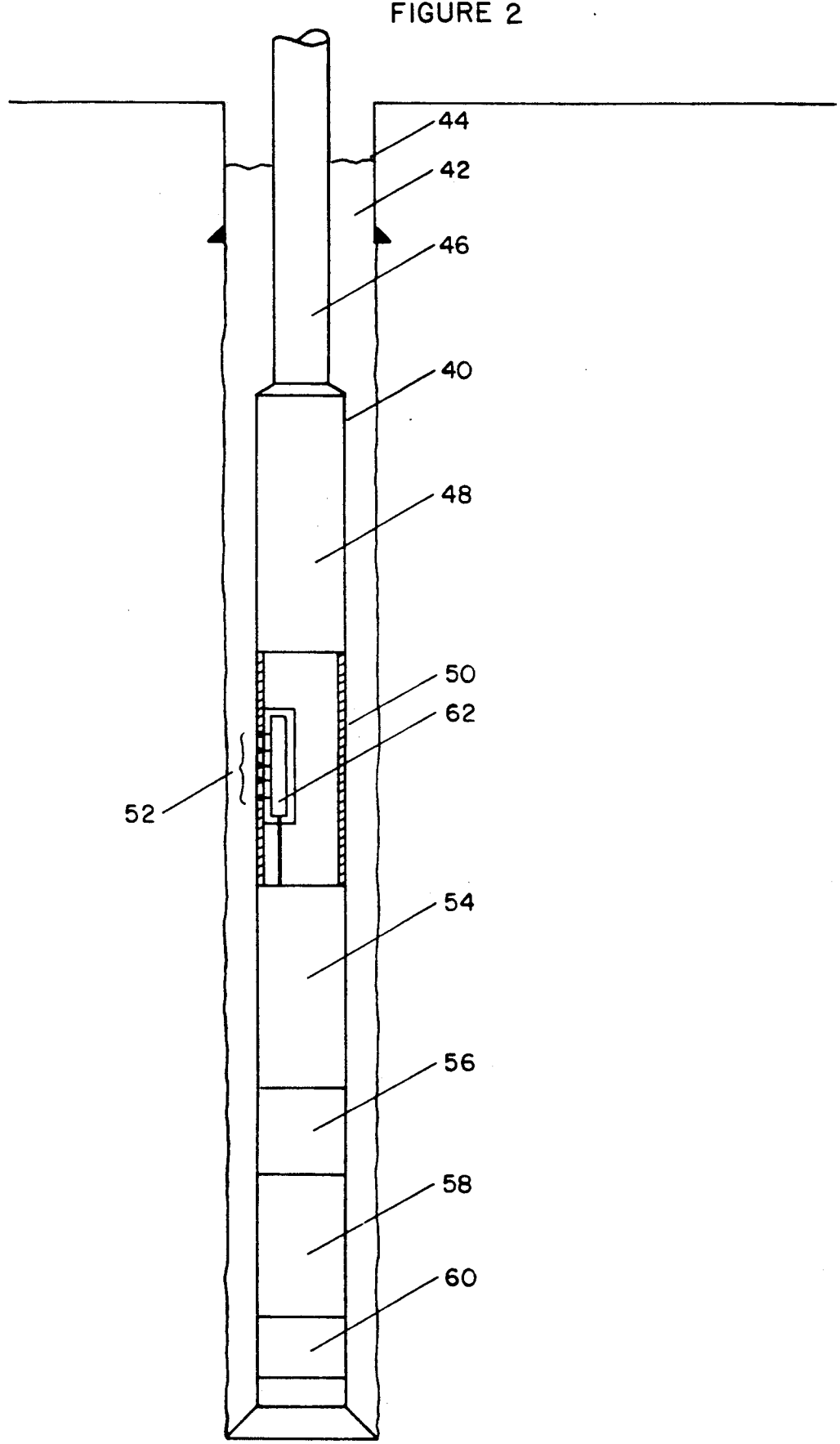
FIG. 2 hereof is a representation of a section of a drillstring, showing the various individual modules which can be used in the practice of the present invention for making measurements while drilling.

FIG. 2 hereof is a representation of a test tool of the present invention when used on a drillstring for making measurements while drilling. The drillstring 40 is shown down a borehole 42 filled with drilling mud 44. A drillstring is usually comprised of various modules, also known as drill collars, each of which serves a specific function. For example, the modules which can be used on a drillstring in the practice of the present invention include a drillpipe 46 connected at its lower end to a drill collar 48. The module, or apparatus of the present invention is a spontaneous potential module 50 which contains a spontaneous potential processing cartridge 62 connected to a series of vertically spaced electrodes. It is preferred that the spontaneous potential module be coated with an insulating hard material such as an epoxy to protect the module from wear. The electrodes 52 for purposes of the tool illustrated in this FIG. 2, comprises six button type electrodes which are located at or near the middle of the tool and which are separated from each other by a distance of from about 0.5 to 5 ft, preferably from about 0.5 to 3 ft, more preferably from about 0.5 to 2 ft, and most preferably from about 0.5 to 1 ft. While the electrodes for purposes of this FIG. 2 are button electrodes, it is understood that they may also be of any other appropriate design, such as ring electrodes. The electrodes are connected to an electronic circuit located in the module. If button electrodes are used, it is preferred that they by vertically aligned. Further, if a downhole recording means is chosen as the principal means of data acquisition, then the module can be powered with batteries and equipped with a recording means. In any case, a surface system will be necessary to decode and record the data transmitted, or to read the data which is stored in the module memory when it is brought to the surface.

The drillstring of FIG. 2 hereof also includes various other functional modules, or drill collars, merely to illustrate a typical commercial drillstring which would include the module of the present invention. It is understood that these other modules do not constitute part of the present invention. Referring again to FIG. 2, there is provided a logging module 54 which measures and transmits and/or records such parameters as resistivity, gamma ray, formation density, etc. Also provided is a pressure pulse transmission module 56 for transmitting data to the surface during mud circulation. While mud stream pressure is the most widely used method to transmit data to the surface, it is understood that other appropriate methods can also be used. Such other appropriate methods include electromagnetic transmissions. In electromagnetic transmission systems, information is transmitted at about the same rate as with mud systems but, with a battery-powered system, no mud circulation is required. Two-way communication is possible, and the information stored can be retrieved when the tool is still in the borehole. Since no mud circulation is required, the measurements can be performed with the drillstring while tripping. That is, while raising or lowering the drillstring after changing a bit. In this way one can compare the spontaneous potential curve for a given formation at various times.

The drillstring also contains a directional module 58. Such a module can be any appropriate module used for measuring borehole inclination. One type of module suitable for use herein is one which incorporates the use of three accelerometers. With these accelerometers, the three components of the gravity acceleration vector can be measured in any frame of reference. In a drillstring tool, the axes of the frame of reference are the tool (borehole) axis, the tool face direction, and the third axis is normal to both. The use of such a tool and the calculations used to determine the tool, or drillstring, inclination are well within the ordinary skill of those possessing ordinary skill in the art. A description of such determinations can be found in "An Overview of Measurement While Drilling—Logging While Drilling Technology," by Robert Desbrandes, Proceedings, Measurement While Drilling Symposium, Louisiana State University, Baton Rouge, La., pp. 5–46. Feb. 26–27, 1990, which is incorporated herein by reference.

Another module which can be included on the drillstring is a mechanical data module 60. This module measures mechanical information such as weight-on-bit, torque, and bending moment by use of strain gages located in the module. The strain gages are resistors with straight fine wires oriented in the direction of the strain to be measured.

Figure 3:
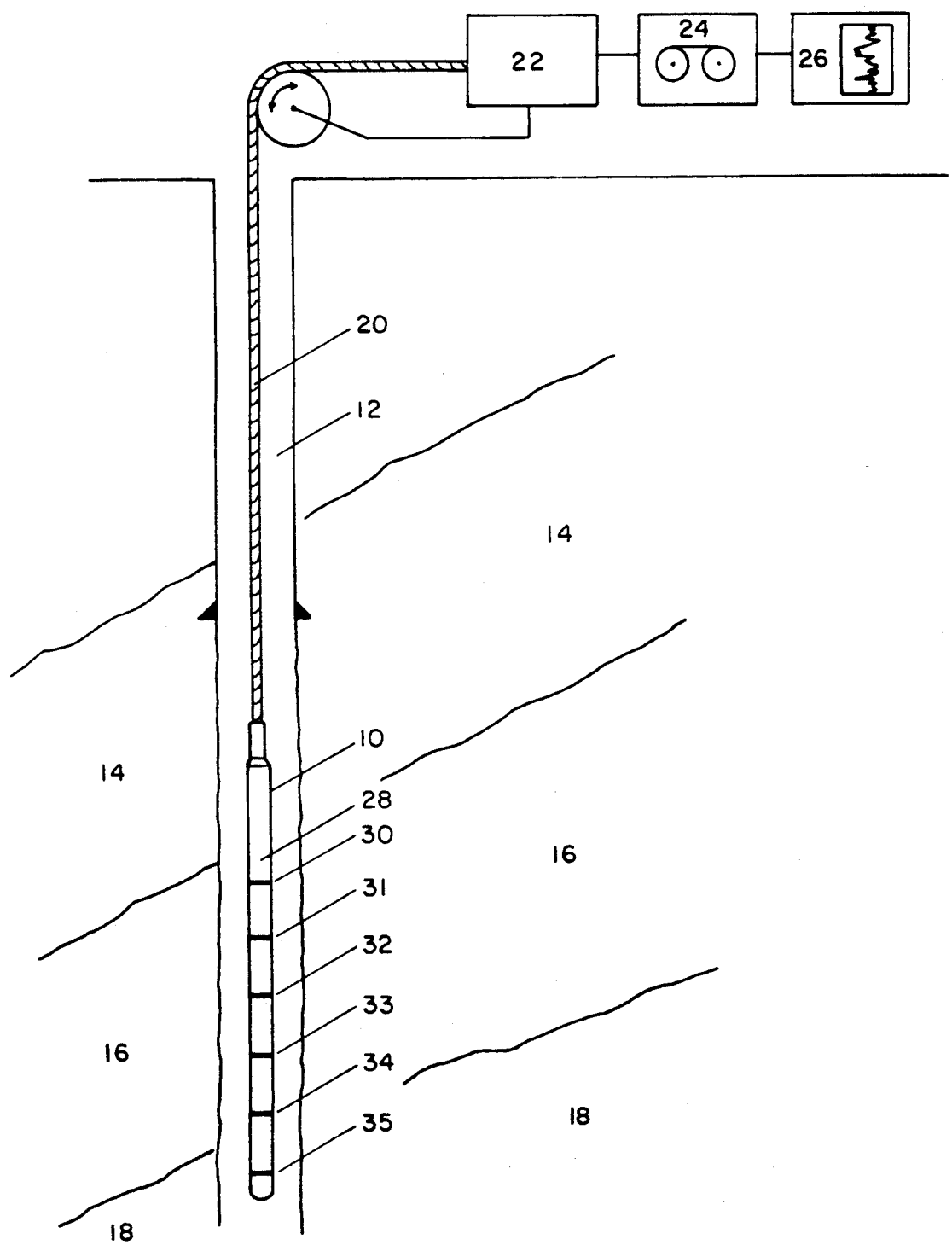
FIG. 3 depicts a wire line test tool of the present invention in a downhole position for making measurements of electrical potential in the borehole.

Referring now to FIG. 3 hereof, a wireline test tool 10 of the present invention is shown in a borehole 12 penetrating one or more earth formations 14, 16 and 18. As illustrated, the tool 10 is suspended in the borehole on a conventional multi-conductor cable 20 and is spooled in the usual fashion on a suitable winch at the surface and coupled to the surface portion of a tool control system 22 which contains electronics and computing means. The cable, when moving up or down, activates a depth measuring device, whose indications are sent to the electronic and computing means. The electronic apparatus contains the circuits and computerized systems to execute the measurements. A digital recorder 24, tape or diskette, records the final spontaneous potential values versus depth. An analog curve recorder 26 may be added for obtaining a hard copy, and a cathodic display can be used for real-time visualization. The test tool is comprised of an insulated elongated body having a section 28 which houses a voltmeter and a multiplex system to transmit the various voltage readings to the surface. While it is preferred that a voltmeter be housed in the test tool itself, it may also be located at the surface. Further, it is preferred that the cable contain at least two pairs of conductors, one to bring electrical power to the tool, and one to bring the spontaneous potential signals to the surface. The tool contains a series of ring electrodes 30 to 35, one of which is a reference electrode, which are vertically separated from one another by a distance of about 0.5 to 5 feet, preferably from about 0.5 to 3 feet, more preferably from about 0.5 to 2 feet, and most preferably from about 0.5 to 1 foot. It is preferred that the electrodes be equidistant apart. It is to be understood that the actual vertical distance separating the electrodes is not as much a function of technical limitations as it is a function of practical size and cost considerations. Of course, if the electrodes are too close together then differential readings between electrodes would be more difficult to measure and the time needed for obtaining a spontaneous potential curve throughout the borehole would be exorbitant. All of the electrodes, except the reference electrode, are connected to a high impedance digital millivoltmeter. The reference potential of the millivoltmeter is connected to the reference electrode. Voltage and depth measurements can be fed into a computer and processed. Conventional methods for obtaining spontaneous potential curves require that the reference electrode be at the surface, instead of downhole, as is the case for the present invention.

Figure 4:
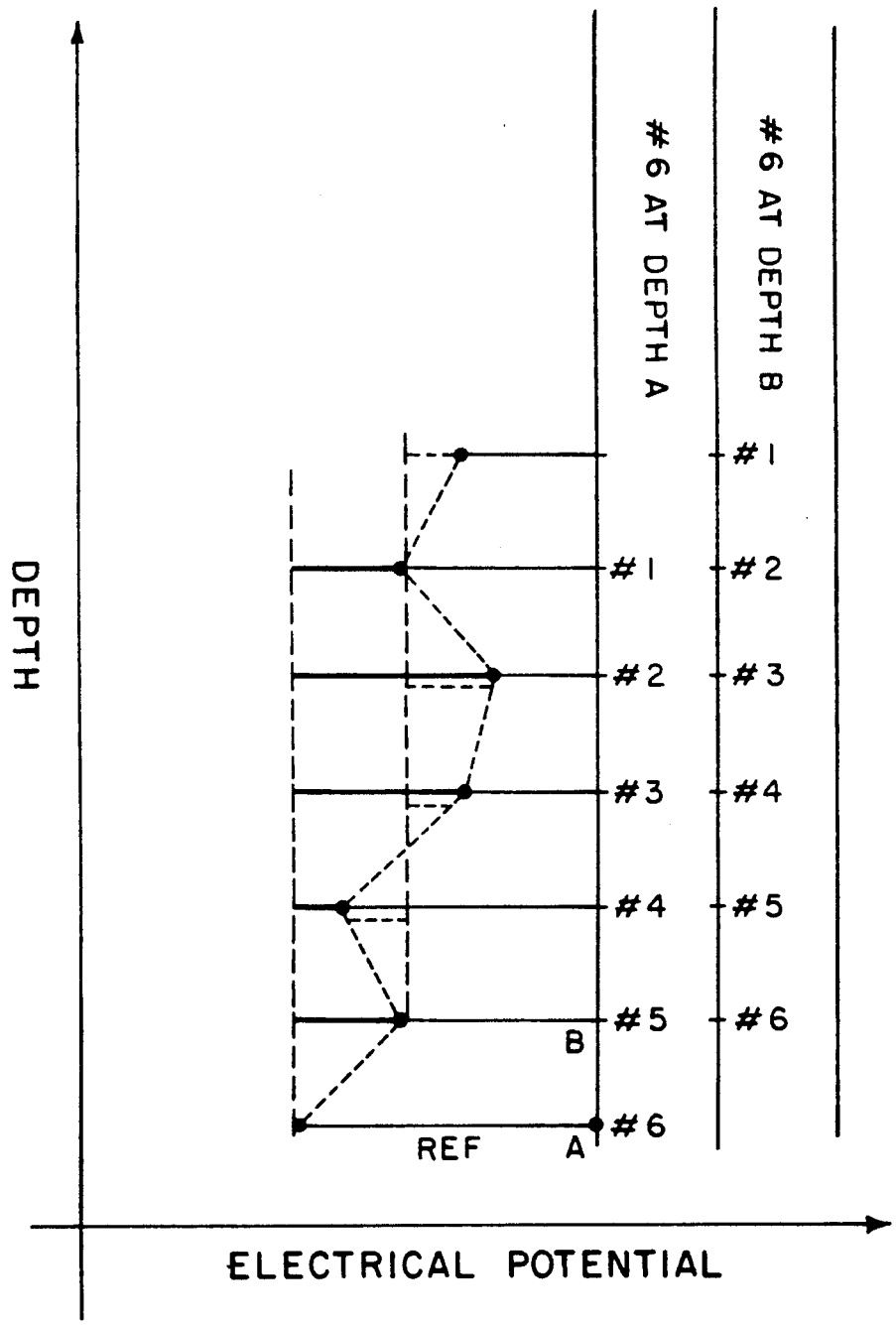
FIG. 4 hereof is a representation of how a spontaneous potential curve is generated by the practice of the present invention by incremental raising the test tool of the present invention to the surface while making measurements at each increment.

The principle of operation of the present invention is illustrated in FIG. 4 hereof wherein a spontaneous potential curve is obtained by raising a wireline test tool, as described above, to the surface. It is assumed, for purposes of this illustration, that the electric potentials measured represent the potentials in the borehole at the depth of each electrode and that the electrodes are equidistant apart. When six electrodes are used, five potentials will be measured, one from each of electrodes 1-5, with electrode 6 being a reference electrode. When the electrodes are one foot apart and the tool is stationary, a snapshot of a section of the spontaneous potential curve at depth A in the borehole is defined as voltages $V_1$, $V_2$, $V_3$, $V_4$, and $V_5$, with respect to reference electrode #6. When the tool is raised one foot, to depth B, electrode #6 will replace the position of electrode #5, and electrode #5 will replace the position of electrode #4, and so on. By readjusting the reference potential to the potential of the electrode that electrode #6 replaced, the snapshot can be extended another foot. Thus, the tool can be moved up and measurements taken at one foot increments to obtain a complete curve without the need for a surface reference electrode. This eliminates substantially all cable interference.

If the electrodes are not equidistant apart, or if measurements are made at distances which are not equal to the distance between the electrodes, or if the electrodes are too far apart to provide a smooth curve when the measurements are plotted, then it is preferred to use conventional interpolation techniques to obtain a smooth curve. Such techniques include the use of a smoothing algorithm. Further, curve matching may also be required. That is, each additional so-called snap-shot curve generated at each incremental step and the immediately previously snap-shot curve is matched in their overlapping parts. Such techniques are within the ordinary skill of those of one having ordinary skill in the. Commercial software packages, such as *Cricket*, available from Cricket Software Corp., Malvern, Pa., provides a convenient form for performing curve smoothing and matching. Furthermore, a curve coherence coefficient can be calculated to give an indication of any systematic errors. Random errors can be estimated by computing the standard deviation between increments, or snap-shots.

What is claimed is:

1. A method for obtaining a spontaneous potential curve generated from a well borehole traversed by an earth formation, which method comprises: (a) positioning a wireline downhole apparatus in a well borehole to a predetermined depth, said apparatus comprising: (i) an elongated body; (ii) a series of three or more vertically spaced electrodes situated along at least a portion of the length of said elongated body, for measuring electrical potential of earth formations which traverse the well borehole, wherein one of the electrodes is a reference electrode for measuring the electrical potential of the formation at each depth to which it is positioned; (iii) means for recording and storing in said apparatus, or a means for transmitting to the surface the various electrical potentials; (b) raising, or lowering, the apparatus; and (c) measuring and recording the electrical potential of each electrode at incremental depths; and (d) generating a spontaneous potential curve by overlapping the electrical potential readings at each common depth.

2. The method of claim 1 wherein the electrodes are from about 0.5 to 3 feet apart.

3. The method of claim 1 wherein the electrodes are equidistant apart and are about 0.5 to 2 feet apart and the measurements are made while the apparatus is being lowered into the well borehole.

4. The method of claim 1 wherein the electrodes are from about 0.5 to 2 feet apart and the measurements are made while the tool is being raised from the well borehole.

5. The method of claim 4 wherein the total number of electrodes is 5 to 6.

6. A method for obtaining a spontaneous potential curve while drilling a well borehole traversed by an earth formation, which method comprises: (a) drilling a well borehole with a drillstring which includes a module containing: (i) a series of three or more vertically spaced electrodes situated along at least a portion of the length of the module for measuring electrical potential of earth formations traversing the well borehole, wherein one of the electrodes is a reference electrode for measuring the electrical potential of the formation at each depth to which it is positioned: (ii) means for recording and storing in said module, or a means for transmitting to the surface, the various electrical potential; (b) taking a measurement of the electrical potential of the electrodes at incremental depths during drilling; and (c) recording and generating a spontaneous potential curve from said measurement by overlapping the electrical potential readings at each common depth.

7. The method of claim 6 wherein the electrodes are from about 0.5 to 3 feet apart.

8. The method of claim 6 wherein the electrodes are equidistant apart and are about 0.5 to 2 feet apart and the measurements are made while the apparatus is being lowered into the well borehole.

9. The method of claim 6 wherein the electrodes are from about 0.5 to 2 feet apart and the measurements are made while the tool is being raised from the well borehole.

10. The method of claim 9 wherein the total number of electrodes is 5 or 6.

* * * * *